United States Patent
Cohen et al.

(10) Patent No.: US 12,001,498 B2
(45) Date of Patent: Jun. 4, 2024

(54) AUTOMATIC ARTICLE ENRICHMENT BY SOCIAL MEDIA TRENDS

(71) Applicant: SNAP INC., Venice, CA (US)

(72) Inventors: Eran Cohen, Ramat-Gan (IL); Efrat Rotem, Haifa (IL)

(73) Assignee: Snap Inc., Santa Monica, CA (US)

( * ) Notice: Subject to any disclaimer, the term of this patent is extended or adjusted under 35 U.S.C. 154(b) by 448 days.

(21) Appl. No.: 14/730,358

(22) Filed: Jun. 4, 2015

(65) Prior Publication Data
US 2015/0356101 A1 Dec. 10, 2015

Related U.S. Application Data

(60) Provisional application No. 62/138,551, filed on Mar. 26, 2015, provisional application No. 62/007,974, filed on Jun. 5, 2014.

(51) Int. Cl.
*G06F 16/9536* (2019.01)
*G06F 16/28* (2019.01)
(Continued)

(52) U.S. Cl.
CPC ........ *G06F 16/9536* (2019.01); *G06F 16/285* (2019.01); *G06F 16/951* (2019.01);
(Continued)

(58) Field of Classification Search
CPC .... G06F 16/9535; G06F 16/24; G06F 16/245; G06F 16/248; G06F 16/33;
(Continued)

(56) References Cited

U.S. PATENT DOCUMENTS 6,266,681 B1 * 7/2001 Guthrie .................. G06F 9/451
707/999.01
8,117,225 B1 * 2/2012 Zilka ................ G06F 17/30864
707/672
(Continued)

FOREIGN PATENT DOCUMENTS

| IL | 239237 A | 4/2019 |
| WO | WO 2010/144915 | 12/2010 |
| WO | WO 2013/024397 | 2/2013 |

OTHER PUBLICATIONS

European Search Report and the European Search Opinion dated Aug. 6, 2015 From the European Patent Office Re. Application No. 15170648.8.
(Continued)

*Primary Examiner* — Amanda L Willis
(74) *Attorney, Agent, or Firm* — Schwegman Lundberg & Woessner, P.A.

(57) ABSTRACT

There is provided a method for creating a presentation based on grouping of social media content, comprising: receiving a trend represented by at least one term; sending first requests to social network servers, each request including the at least one term; aggregating first user uploaded media content items received from the social network servers in response to the requests; extracting terms from the aggregated user uploaded media content items; associating at least some of the extracted terms with the trend; sending second requests to the social network servers, each request including the at least some of the extracted terms associated with the trend; aggregating second user uploaded media content items received from the social network servers in response to the second requests; and forwarding at least some members of the aggregated second user uploaded media content items to a presentation on a client terminal.

14 Claims, 9 Drawing Sheets

(51) Int. Cl.
- *G06F 16/951* (2019.01)
- *G06F 16/9535* (2019.01)
- *G06F 16/9538* (2019.01)
- *G06F 16/958* (2019.01)
- *G06F 40/20* (2020.01)
- *G06Q 50/00* (2012.01)
- *H04L 67/02* (2022.01)

(52) U.S. Cl.
CPC ...... *G06F 16/9535* (2019.01); *G06F 16/9538* (2019.01); *G06F 16/958* (2019.01); *G06F 40/20* (2020.01); *G06Q 50/01* (2013.01); *H04L 67/02* (2013.01)

(58) Field of Classification Search
CPC ............... G06F 16/3331; G06F 16/334; G06F 16/3325; G06F 16/3349; G06F 16/338; G06F 16/335; G06F 16/337; G06F 16/43; G06F 16/435; G06F 16/438; G06F 16/437; G06F 16/53; G06F 16/535; G06F 16/538; G06F 16/532; G06F 16/63; G06F 16/638; G06F 16/635; G06F 16/632; G06F 16/73; G06F 16/738; G06F 16/285; G06F 16/951

See application file for complete search history.

(56) References Cited

U.S. PATENT DOCUMENTS

| | | | |
|---|---|---|---|
| 8,352,455 B2 | 1/2013 | Tareen et al. | |
| 8,468,083 B1* | 6/2013 | Szulczewski | G06Q 30/02 705/36 R |
| 8,484,015 B1* | 7/2013 | Wolfram | G06F 16/3329 704/9 |
| 8,972,420 B1 | 3/2015 | Story, Jr. et al. | |
| 11,625,443 B2 | 4/2023 | Rotem et al. | |
| 2007/0214131 A1* | 9/2007 | Cucerzan | G06F 16/951 |
| 2008/0235209 A1* | 9/2008 | Rathod | G06F 16/951 |
| 2009/0030899 A1 | 1/2009 | Tareen et al. | |
| 2009/0064247 A1 | 3/2009 | Biniak et al. | |
| 2009/0070346 A1 | 3/2009 | Savona et al. | |
| 2010/0083105 A1 | 4/2010 | Channabasavaiah | |
| 2010/0312769 A1* | 12/2010 | Bailey | G06F 17/30705 707/740 |
| 2012/0213404 A1 | 8/2012 | Steiner | |
| 2012/0290605 A1* | 11/2012 | Ickman | G06F 16/23 707/769 |
| 2012/0290968 A1 | 11/2012 | Cecora | |
| 2013/0041750 A1 | 2/2013 | Ye et al. | |
| 2013/0219012 A1* | 8/2013 | Suresh | G09G 5/14 709/217 |
| 2013/0275505 A1 | 10/2013 | Gauglitz et al. | |
| 2013/0297380 A1 | 11/2013 | Godsey | |
| 2013/0339357 A1 | 12/2013 | Eldawy et al. | |
| 2014/0013203 A1 | 1/2014 | Rogoveanu | |
| 2014/0040282 A1 | 2/2014 | Mann et al. | |
| 2014/0122483 A1 | 5/2014 | Zhang et al. | |
| 2014/0132702 A1 | 5/2014 | Leibovich et al. | |
| 2014/0250126 A1 | 9/2014 | Baldwin et al. | |
| 2014/0324928 A1 | 10/2014 | Tinker et al. | |
| 2015/0019203 A1 | 1/2015 | Smith et al. | |
| 2015/0227517 A1 | 8/2015 | Lymberopoulos et al. | |
| 2015/0319509 A1 | 11/2015 | Huang et al. | |
| 2015/0356102 A1 | 12/2015 | Cohen et al. | |
| 2015/0356190 A1 | 12/2015 | Rotem et al. | |
| 2015/0356191 A1 | 12/2015 | Rotem et al. | |
| 2022/0292152 A1 | 9/2022 | Rotem et al. | |

OTHER PUBLICATIONS

"Israel Application Serial No. 239237, Office Action dated May 23, 2017", w/ English Translation, 4 pgs.

"Israelian Application Serial No. 239238, Office Action dated Jun. 8, 2015", w. English Translation, 3 pgs.

"U.S. Appl. No. 14/730,336, Final Office Action dated Dec. 15, 2017", 17 pgs.

"Israel Application Serial No. 239237, Office Action dated Dec. 12, 2017", 10 pgs.

European Search Report and the European Search Opinion dated Sep. 21, 2015 From the European Patent Office Re. Application No. 15170647.0.

Notification of European Publication Number and Information on the Application of Article 67(3) EPC Dated Nov. 11, 2015 From the European Patent Office Re. Application No. 15170648.8.

Official Action dated Nov. 6, 2015 From the US Patent and Trademark Office Re. U.S. Appl. No. 14/809,219.

Official Action dated Nov. 20, 2015 From the US Patent and Trademark Office Re. U.S. Appl. No. 14/805,497.

Communication Pursuant to Rule 69 EPC—Reminder Concerning Payment of the Designation Fee (Art.79(2) EPC) and of the Examination Fee (Art.94(1) EPC)—and Invitation Pursuant to Rule 70a(1) EPC dated Dec. 14, 2015 From the European Patent Office Re. Application No. 15170648.8.

"U.S. Appl. No. 14/730,336, Examiner Interview Summary dated Nov. 9, 2017", 3 pgs.

"U.S. Appl. No. 14/730,336, Non Final Office Action dated Sep. 12, 2017", 17 pgs.

"U.S. Appl. No. 14/730,336, Response filed Nov. 10, 2017 to Non Final Office Action dated Sep. 12, 2017", 12 pgs.

"Israel Application Serial No. 239238, Office Action dated Oct. 15, 2017", W/English Translation, 4 pgs.

"U.S. Appl. No. 14/730,336, Advisory Action dated Feb. 23, 2018", 4 pgs.

"U.S. Appl. No. 14/730,336, Response filed Feb. 6, 2018 to Final Office Action dated Dec. 15, 2017", 13 pgs.

"Israel Application Serial No. 239237, Response filed Apr. 9, 2018 to Office Action dated Dec. 12, 2017", 57 pgs.

"Israel Application Serial No. 239238, Response filed Jan. 8, 2018 to Office Action dated Oct. 15, 2017", 2 pgs.

"U.S. Appl. No. 14/730,336, Final Office Action dated Mar. 6, 2019", 12 pgs.

"U.S. Appl. No. 14/730,336, Response filed Jan. 21, 2019 to Non Final Office Action dated Oct. 19, 2018", 13 pgs.

"U.S. Appl. No. 14/730,336, Response filed May 6, 2019 to Final Office Action dated Mar. 6, 2019", 12 pgs.

"U.S. Appl. No. 14/730,336, Advisory Action dated May 31, 2019", 3 pgs.

"U.S. Appl. No. 14/730,336, Examiner Interview Summary dated Jun. 11, 2019", 3 pgs.

"U.S. Appl. No. 14/730,336, Response filed Jul. 8, 2019 to the Advisory Action dated May 31, 2019", 12 pgs.

"U.S. Appl. No. 14/730,336, Non Final Office Action dated Dec. 6, 2019", 15 pgs.

"Israel Application Serial No. 239238, Office Action dated Sep. 26, 2019", w/ English Translation, 8 pgs.

"Israel Application Serial No. 239238, Response filed Jan. 16, 2020 to Office Action dated Sep. 26, 2019", w/ English Claims, 41 pgs.

"U.S. Appl. No. 14/730,336, Advisory Action dated Jun. 18, 2020", 4 pgs.

"U.S. Appl. No. 14/730,336, Examiner Interview Summary dated Jun. 9, 2020", 3 pgs.

"U.S. Appl. No. 14/730,336, Final Office Action dated Apr. 9, 2020", 15 pgs.

"U.S. Appl. No. 14/730,336, Response filed Apr. 1, 2020 to Non Final Office Action dated Dec. 6, 2019", 12 pgs.

"U.S. Appl. No. 14/730,336, Response filed Jun. 8, 2020 to Final Office Action dated Apr. 9, 2020", 14 pgs.

"U.S. Appl. No. 14/730,336, Non Final Office Action dated Oct. 20, 2020", 19 pgs.

"Israel Application Serial No. 239238, Office Action dated Nov. 10, 2020", w/ English Translation, 13 pgs.

"Israel Application Serial No. 263074, Office Action dated Oct. 19, 2020", w/ English Translation, 6 pgs.

"U.S. Appl. No. 14/730,336, Examiner Interview Summary dated Jan. 8, 2021", 2 pgs.

(56) References Cited

OTHER PUBLICATIONS

"U.S. Appl. No. 14/730,336, Final Office Action dated Jan. 28, 2021", 20 pgs.
"U.S. Appl. No. 14/730,336, Response filed Jan. 18, 2021 to Non Final Office Action dated Oct. 20, 2020", 14 pgs.
"U.S. Appl. No. 14/730,336, Response filed May 28, 2021 to Final Office Action dated Jan. 28, 2021", 12 pgs.
"Israel Application Serial No. 239238, Response filed Mar. 4, 2021 to Office Action dated Nov. 10, 2020", 19 pgs.
"Israel Application Serial No. 263074, Response filed Feb. 10, 2021 to Office Action dated Oct. 19, 2020", 47 pgs.
"U.S. Appl. No. 14/730,335, Non Final Office Action dated Oct. 13, 2021", 17 pgs.
"U.S. Appl. No. 14/730,336, Examiner Interview Summary dated Jan. 13, 2022", 2 pgs.
"U.S. Appl. No. 14/730,336, Notice of Allowance dated Feb. 18, 2022", 18 pgs.
"U.S. Appl. No. 14/730,336, Response filed Jan. 13, 2022 to Non Final Office Action dated Oct. 13, 2021", 13 pgs.
"Israel Application Serial No. 283319, Office Action dated Dec. 7, 2021", w/ English translation, 7 pgs.
"U.S. Appl. No. 17/830,120, Preliminary Amendment filed Jun. 1, 2022", 3 pgs.
"Israel Application Serial No. 291035, Office Action dated Jun. 30, 2022", 4 pgs.
"U.S. Appl. No. 17/830,120, Non Final Office Action dated Apr. 14, 2023", 22 pgs.
"Israel Application Serial No. 295003, Notification of Defects in Patent Application dated Dec. 15, 2022", 3 pgs.
"Israeli Application Serial No. 291035, Office Action dated May 17, 2023", w/o English Translation, 4 pgs.
"U.S. Appl. No. 17/830,120, Advisory Action dated Oct. 3, 2023", 4 pgs.
"U.S. Appl. No. 17/830,120, Final Office Action dated Jul. 28, 2023", 22 pgs.
"U.S. Appl. No. 17/830,120, Notice of Allowability dated Nov. 6, 2023", 3 pgs.
"U.S. Appl. No. 17/830,120, Notice of Allowance dated Oct. 26, 2023", 18 pgs.
"U.S. Appl. No. 17/830,120, Response filed Jul. 14, 2023 to Non Final Office Action dated Apr. 14, 2023", 10 pgs.
"U.S. Appl. No. 17/830,120, Response filed Sep. 26, 2023 to Final Office Action dated Jul. 28, 2023", 11 pgs.
"Israel Application Serial No. 305995, Notification Prior to Examination dated Oct. 9, 2023", 4 pgs.
"U.S. Appl. No. 18/535,988, Preliminary Amendment filed Dec. 13, 2023", 3 pgs.

\* cited by examiner

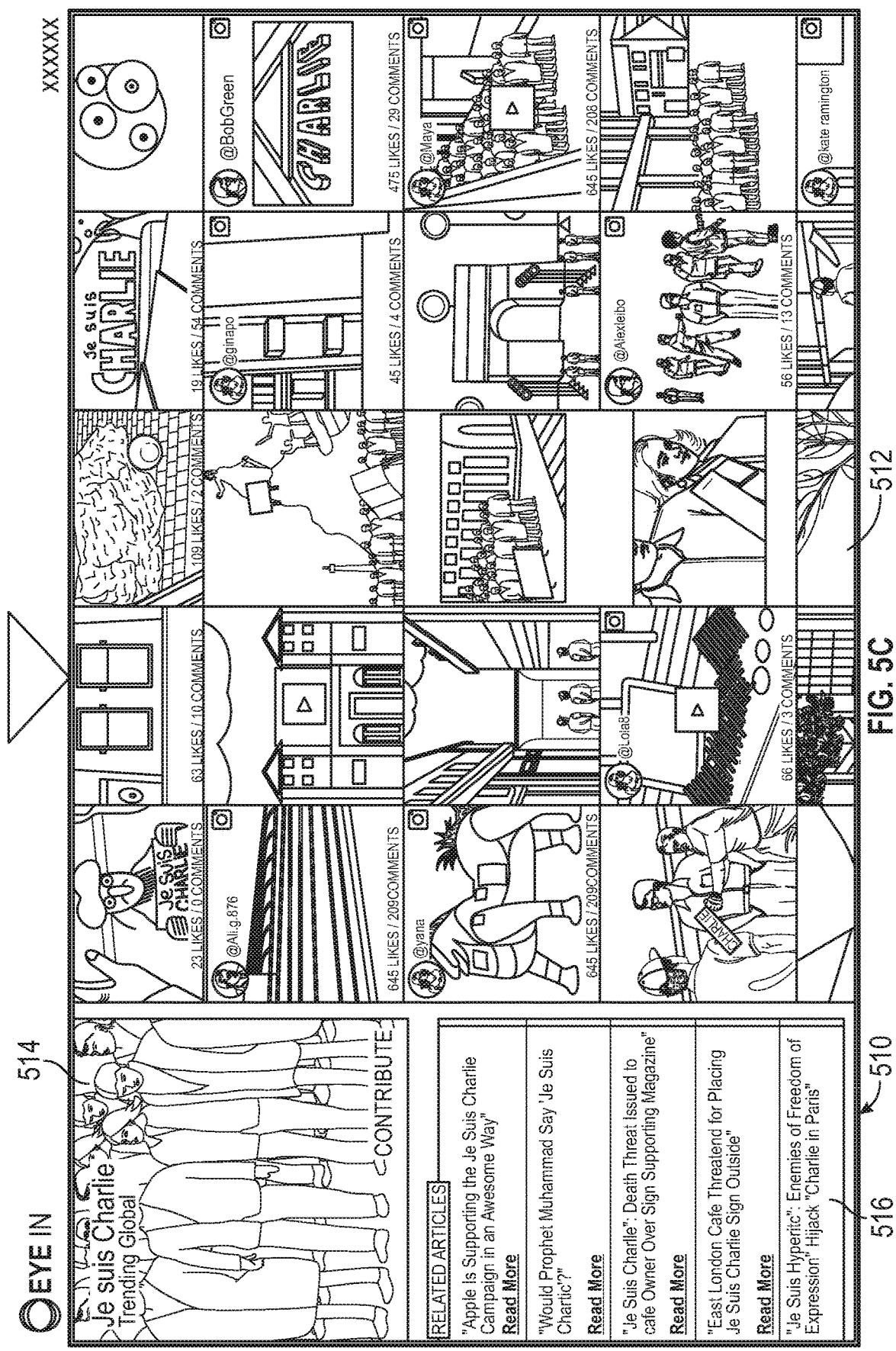

AUTOMATIC ARTICLE ENRICHMENT BY SOCIAL MEDIA TRENDS

RELATED APPLICATIONS

This application claims the benefit of priority under 35 USC § 119(e) of U.S. Provisional Patent Application Nos. 62/007,974 filed on Jun. 5, 2014, and 62/138,551 filed Mar. 26, 2015, the contents of which are incorporated herein by reference in their entirety.

BACKGROUND

The present invention, in some embodiments thereof, relates to network trends and, more specifically, but not exclusively, to methods and systems of content related to network trends.

Network trend topics, such as internet trends, receive greater attention relative to other topics, for example, trends may be searched for on the internet with greater frequency relative to other search terms. Online trends may reflect trends by other communication media such as news, radio, television and other traditional media topics. Examples of trends include: a current news event (e.g., terrorist attack), a wedding of a celebrity, and a concert.

Trends tend to create a lot of network activity with varying sentiment. The internet allows users to provide feedback and/or express emotions in relation to the trend topic, for example, users may post comments on a news article covering the trend, users may express their feelings to the trend by posting emoticons and/or other words, and users may designate a content item related to the trend they liked by designating the item with a like, a content item they didn't like with a thumbs-down, and express emotions such as anger and frustration, for example, by use of capital letters, exclamation marks, and emoticons.

SUMMARY

According to an aspect of some embodiments of the present invention there is provided a method for creating a presentation based on grouping of social media content, comprising: receiving a trend represented by at least one term; sending a plurality of first requests to a plurality of social network servers, each request including the at least one term; aggregating a plurality of first user uploaded media content items received from the plurality of social network servers in response to the plurality of requests, wherein the social network servers hosts a plurality of user profiles containing the user uploaded media content items; extracting a plurality of terms from the aggregated user uploaded media content items; associating at least some of the extracted terms with the trend; sending a plurality of second requests to the plurality of social network servers, each request including the at least some of the extracted terms associated with the trend; aggregating a plurality of second user uploaded media content items received from the plurality of social network servers in response to the plurality of second requests; and forwarding at least some members of the aggregated plurality of second user uploaded media content items to a presentation on a client terminal.

Optionally, receiving a trend comprises analyzing content in a web document to identify a relation with the trend, wherein the trend is documented in a trend dataset storing a plurality of trends each associated with at least one term.

Optionally, the presentation is presented on the client terminal presenting the web document. Alternatively or additionally, the presentation includes a simultaneous presentation implemented as an overlay over a part of the web document.

Optionally, the at least one term and the extracted terms include at least one text word.

Optionally, in response to the first and second requests, the social network servers provide user uploaded media content items stored in association with members selected from the group consisting of: a blog, a personal profile webpage, a personal online repository of content items, and a personal webpage including content items tagged with sharing permission.

Optionally, the plurality of social network servers include connections among users for sharing of the user uploaded media content items.

Optionally, the terms are extracted from at least one of a hashtag, metadata associated with an image, a manually entered user caption, and a manually entered user comment.

Optionally, the method further comprises applying a statistical classifier to the extracted plurality of terms to identify the at least some of the extracted terms correlated with the trend according to a similarity requirement. Optionally, the similarity requirement is dynamically adjusted to match to a group of a predefined size.

Optionally, the forwarded at least some members include at least one advertisement content item related to the trend.

Optionally, the method further comprises selecting the at least some members of the aggregated plurality of second user uploaded media content items according to at least one selection parameter. Optionally, the at least one selection parameter includes language similarity between the at least one term associated with the trend and each of the user uploaded media content items. Alternative or additionally, the at least one selection parameter includes geographical proximity similarity between a geographical location associated with the trend and each of the user uploaded media content items. Alternatively or additionally, the at least one selection parameter includes a ranking of the second user uploaded media content items according at least one characteristics of the user uploaded media content items that is independent of the trend.

Optionally, the at least one characteristic is a member selected from the group consisting of: image quality, user feedback, date of publication, and storage size.

Optionally, the method further comprises ranking the received second plurality of user uploaded media content items according to a relevancy score calculated for each of the received second plurality of user uploaded media content items relative to the respective trend, and forwarding links to a subset of the ranked media content items associated with the trend according to a relevancy requirement.

Optionally, the received first and second plurality of user uploaded media content items are selected by respective servers from the group consisting of: social media content items related to the at least one trend, user comments related to the at least one trend, and user reactions related to the at least one trend.

Optionally, a computer readable medium comprising computer executable instructions adapted to perform the method.

According to an aspect of some embodiments of the present invention there is provided a network node set to be connected to a plurality of clients via a network for creating a presentation based on grouping of social media content related to a trend identified from content of a web document, comprising: a client interface for communicating with at least one client terminal hosting a browser displaying a respective web document; a trend datastore which hosts a trend dataset documenting a plurality of trends each appearing in a plurality of internet web documents, wherein the trend dataset stores trends represented by at least one term; a program store storing code; and a processor coupled to the client interface, the trend datastore, and the program store for implementing the stored code, the code comprising: code to receive a trend represented by at least one term, the trend identified within the respective web document of the respective client terminal; code to send a plurality of first requests to a plurality of social network servers, each request including the at least one term; code to aggregate a plurality of first user uploaded media content items received from the plurality of social network servers in response to the plurality of requests, wherein the social network servers hosts a plurality of user profiles containing the user uploaded media content items; code to extract a plurality of terms from the aggregated user uploaded media content items; code to associate at least some of the extracted terms with the trend; code to send a plurality of second requests to the plurality of social network servers, each request including the at least some of the extracted terms associated with the trend; code to aggregate a plurality of second user uploaded media content items received from the plurality of social network servers in response to the plurality of second requests; and code to forward, via the client terminal, at least some members of the aggregated plurality of second user uploaded media content items to a presentation on the respective client terminal.

Optionally, the network node further comprises code to receive, via the client interface, a request from the respective client terminal hosting a browser displaying the respective web document, code to extract a plurality of terms from a content of the web document; code to identify a relation with at least one trend documented in the trend dataset; wherein the trend represented by at least one term corresponds to the identified at least one trend documented in the trend dataset.

Optionally, the network node further comprises code to receive at least one search term from the at least one client terminal, via the client interface, and wherein the relation to at least one trend documented in the trend dataset is matched according to the at least one search term.

Optionally, the network node further comprises a trend interface for communication with an interface of at least one trend server storing at least one of trend search queries and commonly used phrases uploaded by users to social media networks, to retrieve at least one trend for documentation in the trend dataset.

Optionally, the network node further comprises a social streaming interface for communication with an interface of the plurality of social network servers to collect the plurality of user uploaded media content items.

Optionally, the presentation includes members of the group organized simultaneously as adjacent tiles.

Optionally, the client interface is in communication with a client module installed as an add-on to the browser of the client module. Alternatively or additionally, the client interface is in communication with a web document server having stored thereon a server module that adds a script to the displayed respective web document, wherein the at least one client terminal communicates with the client interface using the script in the respective web document.

According to an aspect of some embodiments of the present invention there is provided a method for identifying at least one trend in a web document, comprising: designating a web document; extracting a plurality of terms from a content of the web document; identifying a relation with at least one trend documented in a trend dataset, wherein the trend dataset stores trends represented by at least one term; and providing the identified at least one trend for at least one of: presentation on a client terminal, further processing, storage, and forwarding.

Optionally, the plurality of terms is extracted using at least one of machine learning and natural language processing methods.

Optionally, the at least one trend is identified by a statistical classifier that maps the extracted terms to the at least one trend.

Optionally, the method further comprises calculating a similarity score between the plurality of terms extracted from the content of the web document and terms stored in relation to at least some trends stored in the trend dataset, and identifying the relation to the at least one trend according to a similarity requirement in view of the similarity score.

Optionally, the method further comprises when two or more trends are identified as related to the content, consolidating the two or more trends into a single trend and matching a single group to the consolidated single trend.

Optionally, the web document includes a text article.

Optionally, the method further comprises creating the trend dataset, by: providing, at least one term representing a trend for documentation in the trend dataset; monitoring a plurality of network documents hosted at a plurality of network servers; aggregating the plurality of network documents according to each respective trend documented in the trend dataset; extracting terms from each aggregated set of network documents; and storing at least some of the extracted terms in association with the respective trend in the trend dataset.

Optionally, the method further comprises ranking, for each trend, the associated extracted terms according to a relevancy score calculated for each of the extracted terms relative to the respective trend, and storing a sub-set of the ranked terms in the trend dataset in association with the trend according to a relevancy requirement.

Optionally, the method is performed by a network node, and the monitoring is performed via an application programming interface (API) associated with each social network server.

Optionally, the method further comprises iteratively updating the trend dataset by removing existing trends within the dataset according to an expiration profile.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-5C are a set of screenshots depicting exemplary presentations based on a grouping of social media content related to a trend identified from content of a web document, in accordance with some embodiments of the present invention.

DETAILED DESCRIPTION

Figure 1:
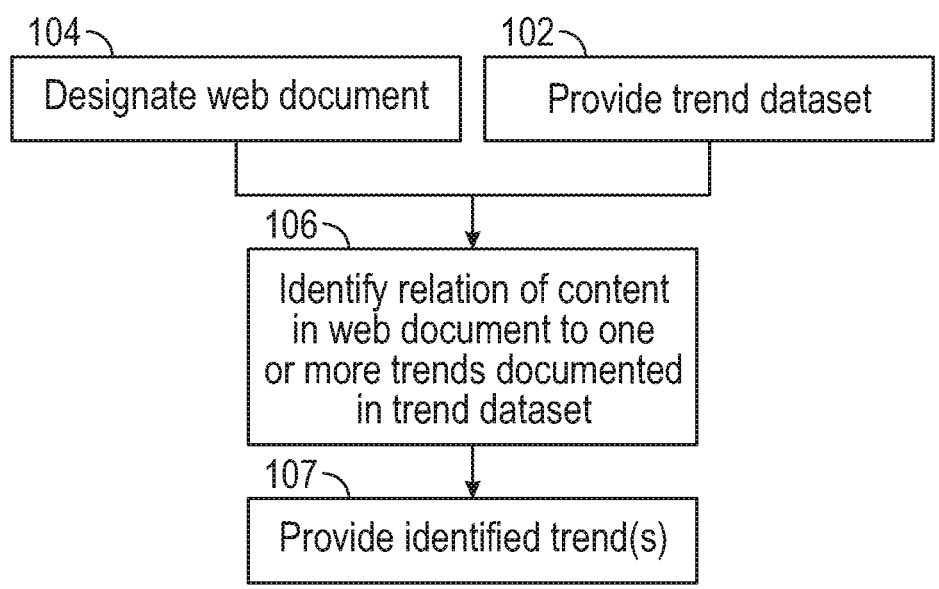
FIG. 1 is a flowchart of a method for identifying one or more trends from content of a web document, in accordance with some embodiments of the present invention.

The present invention, in some embodiments thereof, relates to network trends and, more specifically, but not exclusively, to methods and systems of content related to network trends.

According to some embodiments of the present invention, there are provided methods and/or systems, such as a network node, for creating a presentation for display on a client terminal that includes user uploaded media content items related to one or more trends. The trends may be identified in content of a web document presented on the client terminal, and/or the trend may be manually entered by a user (e.g., requesting the presentation based on the manually entered trend). The user uploaded media content items, for example, photos, comments and/or captions in response to an item, tweets, and blog entries, may be collected by the network node from social network sites, optionally by issuing requests to social network servers hosting the content items. The network node may aggregate the related user uploaded media content items for presentation, optionally simultaneously, in relation to the displayed web document, for example, overlaid on the web document. In this manner, the presentation provides a summary of social network content related to the received trend, optionally according to the trend identified within the web document. The user may select from the presented user uploaded media content items, for example, by clicking a link to the selected content item, to receive a larger and/or more complete presentation of the selected content item.

Optionally, the network node, such as a web server, and/or a client module installed on the client terminal analyzes the network document to identify a relation to one or more trends, by extracting terms from the content of the web document. The extracted terms may be correlated with the trend, for example, by a statistical classifier, and/or a correlation function.

Optionally, multiple social network servers are monitored and/or accessed via related interfaces to provide user uploaded media content items related to each respective trend. Monitoring may be passive and/or active, such as issuing requests to the server to provide the content items. The requests may include terms associated with the trend, for example, key words representing the trend. The received user uploaded media content items may be aggregated by the network node according to related trends. The aggregation may generate a pool of data related to the trend.

Optionally, two or more sets of requests are issued by the network node to the social network servers for user uploaded media content items. Each subsequent set of requests contains terms that are more descriptive and/or more closely related to the trend than the previous set of request.

Optionally, in the first set of request, the terms associated with the received trend are transmitted to the social network servers. The first set of responses, including content items related to the requests, may be aggregated by the network node according to each respective trend. The aggregated set of content items is analyzed, by extracting terms from the aggregated content items that are related to the trend. The second set of request includes at least some of the extracted terms, which better define and/or are more descriptive of the trend relative to the first set of requests. The received second set of content items may be more relevant to the trend than the received first set of content items. It is noted that the second set may be smaller than the first set. Additional sets of requests may be iteratively transmitted as needed, such as to receive social media content items that are better related to the trend. The content items (or subset thereof) related to the identified trend are provided for presentation on the client terminal.

Optionally, the trend, which may be defined by one or more terms, optionally one or more text words, is identified by the network node, for example, based on data provided by an interface of a trend server that monitors the internet to identify trends. The terms associated with the trend may include one or more of the text words.

Optionally, additional terms are included by the network node in associated with the trend, optionally based on terms extracted from content items and/or web documents (e.g., news articles, personal web pages, advertisements) related to the trend. The content items may be passively and/or actively collected by the node from network servers hosting different web documents.

Optionally, a trend dataset creator module implementable by a processor of the network node automatically creates the trend dataset. The trend dataset creator module receives at least one key word representing a trend, for example, from a trend server. Multiple web servers, hosting different web documents, are monitored passively and/or actively (e.g., by issuing requests to an interface) for web documents related to each trend. Terms are extracted from each monitored web document. A sub-set of the extracted terms, which are optionally ranked, are documented in the trend dataset in associated with each respective trend.

Optionally, links to the content items provided by the social network servers may be documented in association with the respective trend. In this manner, each respective trend in the trend dataset may be automatically associated with relevant user uploaded content items. The links may be provided to the client terminal as part of the presentation.

Providing the link provides the user will full access to the content from the presentation. Providing the link may reduce the amount of data stored and/or processed by the network node, for example, transmitting the link instead of the content item itself.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term trend means a topic, such as an abstract topic, which may be represented by one or more terms (e.g., text words) related to words, images, videos, and/or sound, that is related to a significant surge in network activity relative to a previous baseline, for example, a significant increase in online searches for the trend, significant increase in number of views of web documents related to the trend, and/or significant increase in number of user uploaded media contents related to the trend (e.g., images, videos, text, sound, tweets, blog entries, captions and comments). It is noted that trends may recur (e.g., occasionally and/or periodically) after a period of time, for example, related to the world cup held every four years. Baselines of recurring trends may be defined between the recurring trends. A significant increase may be, for example, an increase of at least about 100%, or 10×, or 100×, or 1000× relative to a previous a baseline value (e.g., average), or other intermediate or larger values. The rise from baseline value may occur, for example, within about a minute, or about an hour, or about a day, or about a week, or about a month, or about a year, or other smaller, intermediate or large time frames. It is noted that the baseline value may be zero, for example, for a new previously unknown trend. Examples of trends include: a wedding of a famous actor, a terrorist attack at a certain geographical location, a politician during an election, and an embarrassing incident occurring to a person.

Figure 2A:
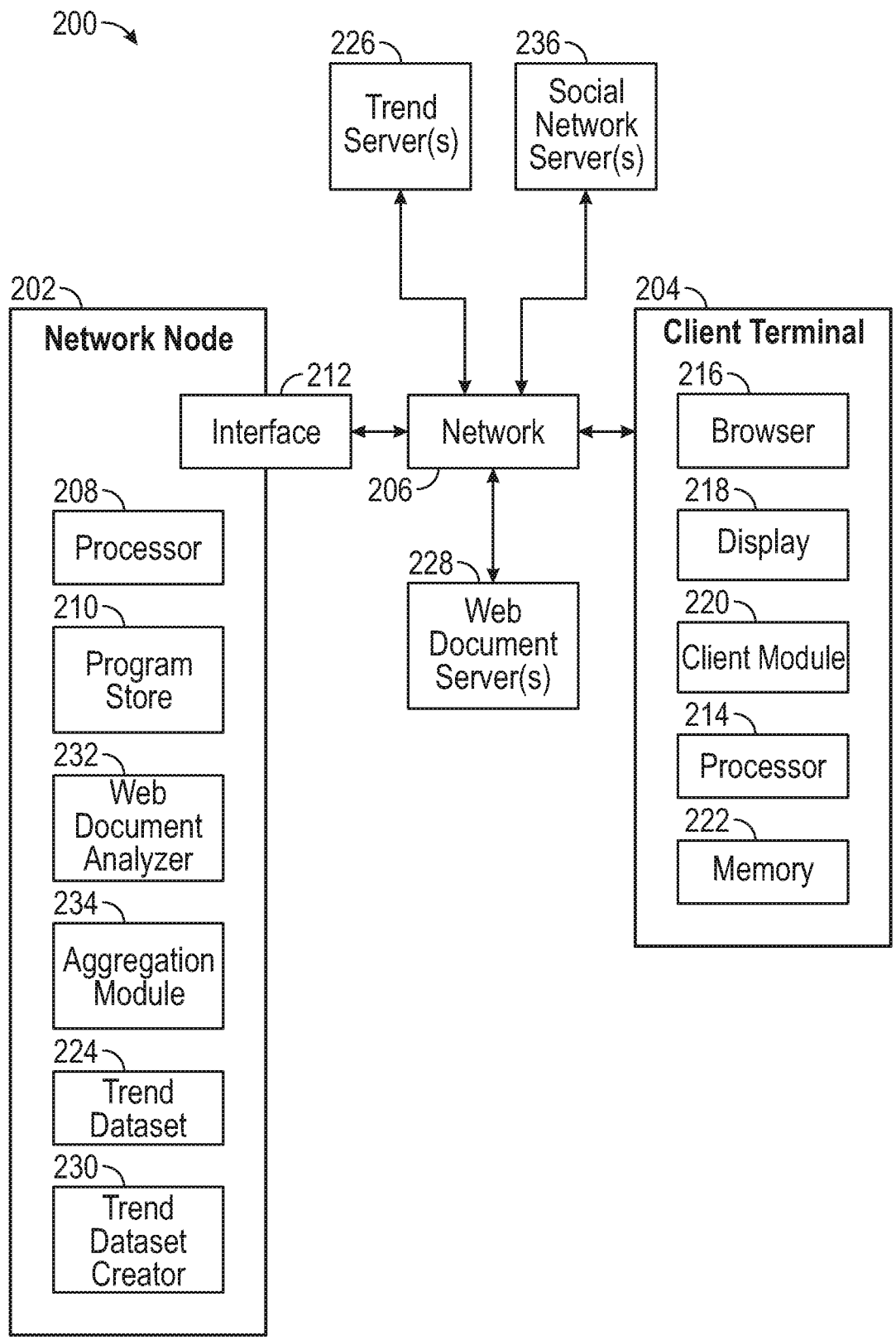
FIG. 2A is a block diagram of components of a system for creating a presentation based on a grouping of social media content related to a trend, in accordance with some embodiments of the present invention.
Figure 2B:
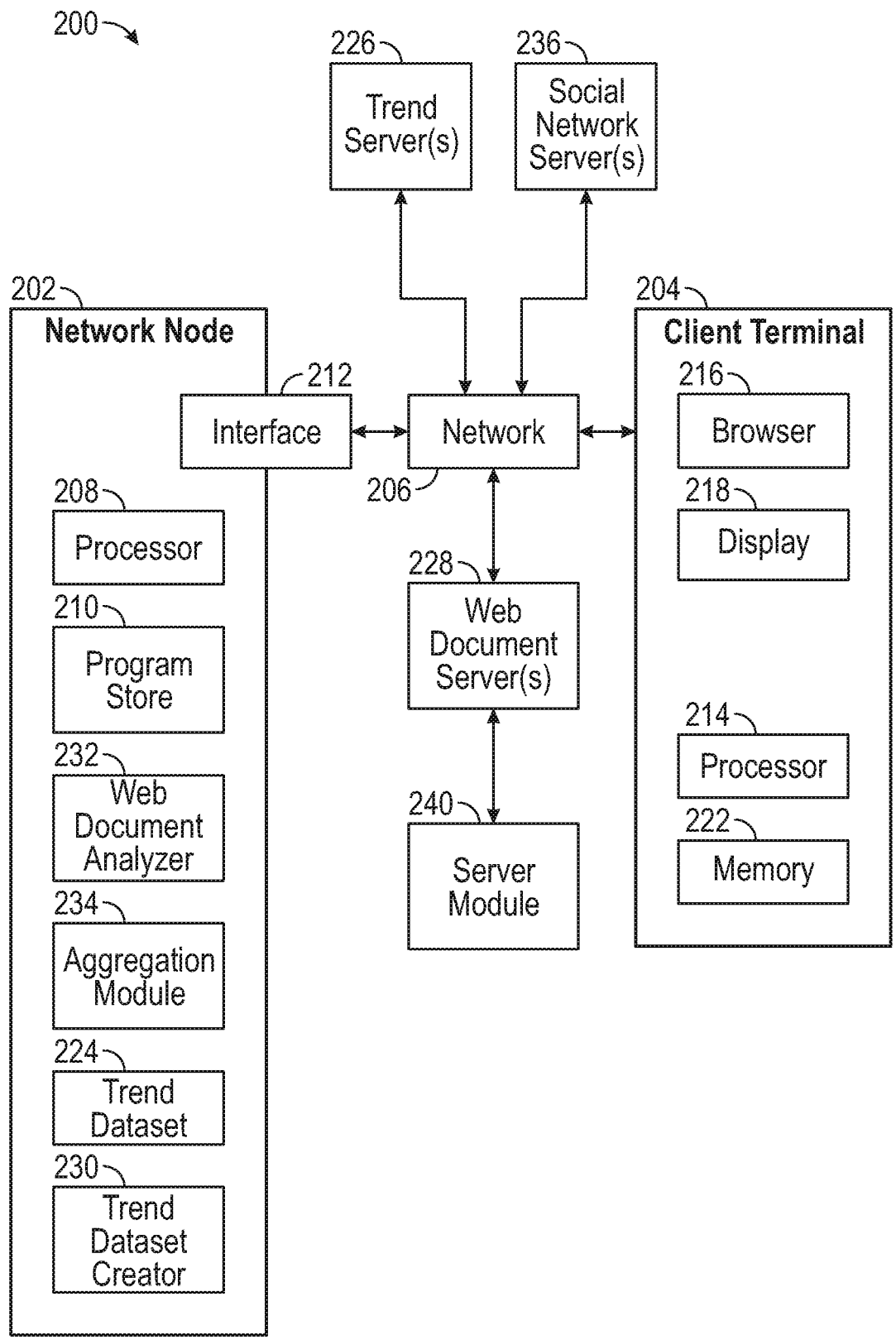
FIG. 2B is a block diagram of components of another implementation of the system for creating a presentation based on a grouping of social media content related to a trend, in accordance with some embodiments of the present invention.

Reference is now made to FIG. 1, which is a flowchart of a method for identifying one or more trends from content of a web document, in accordance with some embodiments of the present invention. Reference is also made to FIG. 2A, which is a block diagram of components of a system that analyzes content of a web document displayed on a client terminal, and/or creates a presentation on the client terminal that includes social media content related to a trend, in accordance with some embodiments of the present invention. The method of FIG. 1 may be executed by the system of FIG. 2A. FIG. 2B is a block diagram of components of another implementation of the system of FIG. 2A. The method of FIG. 1 may be executed by the system of FIG. 2B.

The systems and/or methods described herein cluster the most trend relevant social media content items distributed on different servers on a network (e.g., the internet), and present the media items to the user.

The systems and/or methods described herein may improve performance and/or operation efficiency of a computer and/or computer system, such as the client terminal, network node, and/or communication network. The presentation provides a new set of data, which displays multiple social media content items using less processor and/or memory requirements relative to displaying full versions of the social media item, for example, by presenting smaller versions (and/or portions) of the media items. For example, the presentation clustering of social media content related to the trend, may reduce network bandwidth, improve network utilization by the client, improve client processor utilization, and/or reduce client memory requirements. The performance improvements may result, for example, by the presentation providing a summary of clustered social media content collected from different servers, at different web sites, each server and/or website may have a low volume of user traffic making it difficult to find each content item using a standard web search engine, and/or the total content items residing at each server added together (i.e., without the clustered presentation) may add up to large memory sizes and/or large bandwidth required to download all the content.

The systems and/or methods described herein may improve organization of large quantities of social media content items, by automatically providing a presentation that (optionally simultaneously) summarizes the most relevant social media content items to the trend. The presentation may be overlaid and/or displayed next to a web document from which the trend has been identified based on content. In this manner, the user may quickly glance over the presentation to view reactions by other users to the trend, without having to open another web browser window and/or perform searches. Items of interest to the user may be followed, for example, by clicking a link.

The systems and/or methods described herein provide new functionality features that do not have direct corresponding manual actions. For example, a human would be unable to continuously analyze web documents displayed on a client terminal to identify trends, and/or would be unable to manually associate to a trend a group of user provided media content items selected from a large set of data continuously uploaded to multiple dispersed different web sites.

System 200 includes a network node 202, which is set for connection to one or more client terminals 204 via a network 206. Network node 202 hosts a trend content presentation unit for creating a presentation based on grouping of social media content related to a trend identified based on content of a web document, as described herein. Alternatively or additionally, network node 202 hosts a trend identification unit for identifying one or more trends within a web document. The outputted trend identified by the trend identification unit may serve as input into the trend content presentation unit, for generating the presentation. The trend input into the trend content presentation unit may be obtained from other sources, for example, by a user manually providing the trend via client terminal 204.

Network 206 may include, for example, the internet, a local area network (WLAN), a wireless network such as mobile network, wireless local area network (WLAN) such as Wireless Fidelity (WiFi™), a wireless personal area network (WPAN) such as Bluetooth™ protocol and/or any other network.

Network node 202 may be, for example, a server (e.g., web server), a database, a virtual machine and/or any other network accessible computing unit such as one or more servers.

Network node 202 includes a processor 208, a program store 210 (e.g., memory) storing code, and an interface 212 for communicating with other computers and/or servers via network 206. Processor 208 is coupled to interface 212 and to program store 210 for implementing the stored code. Interface 212 may be, for example, a hardware element such as a network adapter card and/or a software module such as a computer program. Interface 212 may include a single interface that may communicate with multiple sources, and/or multiple interfaces each connecting with a different source. Optionally, a client interface of interface 212 communicates with client terminals 204.

Client terminals 204 may include, for example, a mainframe computer, an enterprise server, a workstation, multiple connected computers, a mobile device such as a Smartphone, a tablet, a wearable device such as Google glass, a Smart watch, a laptop computer and/or the like, a personal computer and/or any device that has one or more network communication modules, such as a network card or chip and runs a web-browser 216 (e.g. Google Chrome™, Internet Explorer™ and/or an application with integral browsing module, such as a news application, and/or web functionalities added to websites using development tools and/or third-party applications). Each client terminal 204 includes a processor 214 for execution of code stored on a memory 222 include in or in communication with client terminal 204. Each client terminal 204 hosts web browser 216 (which may be stored on memory 222) for displaying web documents on a display 218 such as a screen included or in communication with client terminal 204.

Optionally, each client terminal 204 has stored thereon (e.g., on memory 222) a client module 220 for communicating with network node 202 via interface 212, for example for sending and/or receiving data over network 206. Client module 220 transmits a request for the presentation of media items, which may include the web document, the URL of the web document, terms extracted from the web document (e.g., extracted by the client module), and/or the trend in explicit terms (e.g., typing the terms representing the trend into the browser) to network node 202, as described herein, for example, as network messages such as packets and/or frames. Client module 220 receives the presentation from network node 202 for presentation on display 218 in response to the request, as described herein. Client module 220 is set to display the received media content files, either as an overlay or in a designated web client, for example as described herein. Client module 220 may be implemented as an add-on to browser 216, for example as a browser extension, a plug-in, a web application which is loaded with a web document, for instance as an AJAX component or a Javascript and/or the like.

Alternatively or additionally, FIG. 2B depicts an implementation of system 200 that does not include client module 220 of client terminal 204 (e.g., as described with reference to FIG. 2A). Functionalities of client module 220 may be performed by a script (or for example, code, and/or metadata) added to the accessed webpage, optionally by a server module 240 (stored on or in communication with server 228) which adds the script to the web page. Server module 240 may be implemented, for example, as a plug-in, as a software development kit (SDK), application programming interfaces (API), metadata, or other implementations. Server module 240 may be stored as code in a program store of server 228, implementable by a processor of server 228. The script and/or server module 240 allow client terminal 204 to communicate with network node 202 via interface 212 using the script and/or server module 240 in the web document being viewed on display 218 (as described with reference to client module 220).

Optionally, web server 228 includes code implementable by the processor of server 228 (and/or the code is stored in program store 210 of node 202 implementable by processor 208), to allow a user of server 228 (e.g., content publisher) to manually designate matches between articles of web documents (e.g., stored on server 228) and trends. Trends may retrieved from trend dataset 224 of node 202. The manually designated matches may be provided to aggregation module 234 for further processing as described herein.

At 102, a trend datastore which hosts a trend dataset 224 documenting trends each appearing in internet web documents is provided, for example, online newspapers, online magazines, websites of retailers, websites of government organizations, and websites of non-profits. Trend dataset 224 stores each trend in association and/or represented by one or more terms. Optionally, the terms representing the trends and/or extracted terms include words, for example, human read and understood words, such as words found in a dictionary, slang words, shorthand words, contracted words, and/or a phrase without spaces between individual words.

Optionally, trend dataset 224 stores a similarity score and/or correlation score (e.g., calculated as described herein) between each term and the trend.

Trend dataset 224 may be automatically generated by code (e.g., a trend dataset creator module 230) implemented by processor 208 of network node 202. Dataset 224 may be stored on or in communication with network node 202, for example, on a memory within node 202, on a local server and/or or a remote server.

Trend dataset 224 may be implemented for storing trends, associated terms and/or linked to content items, for example, as records, as objects, in an array, in a matrix, and as a list. Individual trends may be stored as one or more terms, (e.g., individual or a phrase) such as text (e.g., words), and/or as codes (e.g., codes that map to words and/or trends).

Figure 6:
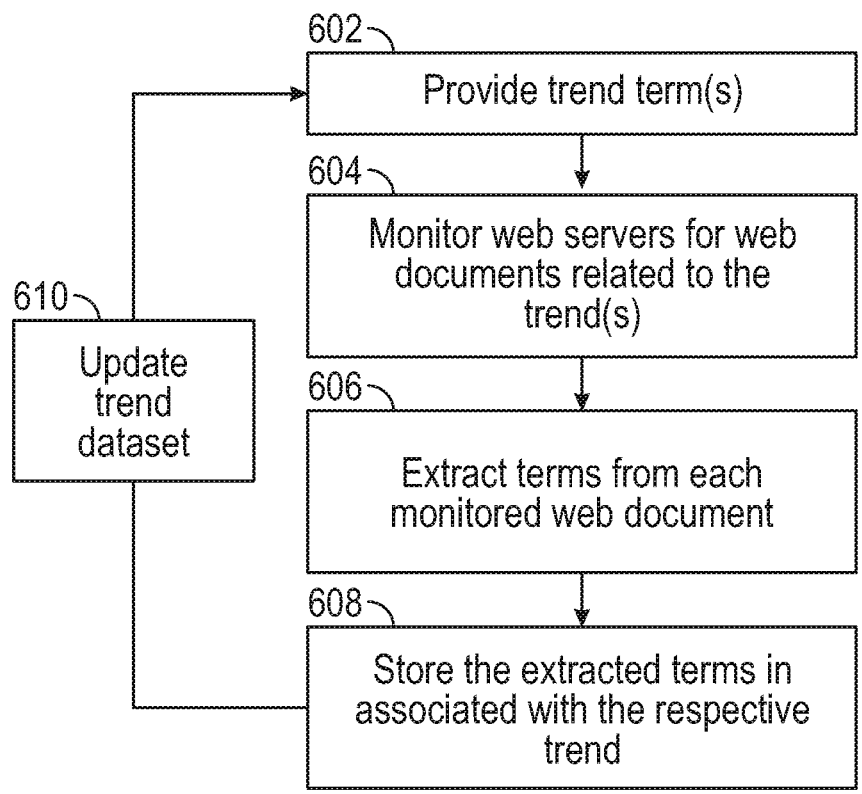
FIG. 6 is a flowchart of a method for creating a trend dataset documenting trends each appearing in network documents, in accordance with some embodiments of the present invention.

Reference is now made to FIG. 6, which is a flowchart of a method for creating a trend dataset documenting trends each appearing in network documents, in accordance with some embodiments of the present invention. The trend dataset may be created by code, such as trend dataset creator 230 module, implementable by processor 208 of network node 202. The trend creation method may identify the most relevant terms associated (e.g., related to and/or describing) with each trend.

At 602, one or more terms representing a trend are provided for documentation in the trend database. The terms may be text words.

Trend dataset 224 may be automatically populated based on trends identified by an external source, such as one or more trend servers 226, for example, Google® Hot Trends (which includes trending search queries entered in the Google® search engine), and/or Twitter® trends (which includes commonly used phrases in current tweets). The trend server may store trend search queries and/or commonly used phrases uploaded by users (e.g., to social media networks and/or as comments on other servers). Code implemented by processor 208 of node 202 may access the trend server to retrieve the trends, via a trend interface of interface 212. The trend server may be accessed using an application programming interface (API) of the trend server to retrieve trends. Trends may be manually entered into trend dataset 224, for example, by a system administrator. Trends may be automatically identified by code implemented by processor 208 of node 202 that crawls the internet and/or analyzed monitored data (e.g., received from server APIs) to identify trends. Trends may be automatically identified by analyzing sources of information available on the internet and/or specialized sources, for example, databases of events, rich site summary (RSS), news websites, user-generated content such as social networks, forums and/or blogs, search engines, official websites (such as of bands and/or sport leagues) and/or other sources.

Each trend may be associated with metadata providing additional descriptions related to the trend, for example, as a tag. Tags may be automatically generated by code executing on node 202, manually by a user, and/or associated with the trend upon receipt from the trend server. Examples of metadata include: abstract topic associated with the trend, geographical location associated with the trend, language of the trend, volume of internet traffic related to the trend, time value related to the trend (e.g., expiration time of the trend, originating time of the trend, and an indication of a real-time trend). Media items for presentation may be sorted, clustered, and/or filtered according to the metadata, as described herein.

At 604, web pages are monitored (e.g., by trend dataset creator 230) at multiple web servers, optionally web document servers 228.

Monitoring may be performed by trend dataset creator 230 using a web document interface component of interface 212, for communication with an interface of one or more web document servers 228. Monitoring may be performed actively and/or passively. For example, active monitoring may be performed by issuing request to APIs of the web servers with request to provide web documents related to the trend terms. For example, passive monitoring may be performed by following links of web documents related to the trend, such as by a crawling module. The monitored web documents may be aggregated according to the related trend. Optionally the web documents are temporarily stored in a datastore in association with node 202.

At 606, terms are extracted (e.g., by trend dataset creator 230) from each of the monitored web document, optionally from each set of aggregated web documents corresponding to each trend. Terms may be extracted by code, such as an extraction engine component of trend dataset creator 230, implemented by processor 208 of node 202. Terms may be extracted based on machine learning methods and/or natural language processing methods.

Terms may be extracted from the text of the content of the web document (e.g., words found in an article, words appearing in an image by an image analysis program that identifies text and/or segments text in the image, and/or words appearing in a video by the image analysis program), from metadata such as tags associated with the web document (e.g., a user label assigned to images describing what is depicted in the image), from the name of the web document, from sounds in the web document (e.g., converted from speech to text by a software module operating on a sound file and/or video file), and/or from images in the web document.

Optionally, the terms are extracted from one or more hashtags.

Optionally, the terms are extracted from metadata (e.g., tags) associated with the web document, such as metadata associated with images.

Optionally, the terms are extracted from a manually entered user comment and/or manually entered user caption (i.e., text words) associated with the web documents.

Optionally, the terms identified with each monitored media content item (i.e., which may be correlated with one or more trends document in the trend datastore) are stored in the datastore and/or in the trend dataset in association with each trend.

Optionally, a similarity correlation is calculated between each (or the set of) extracted term and the term(s) representing the trend. The similarity correlation represents the similarity between the extracted term and the trend term, for example, when the extracted term and the term representing the trend are the same word spelled the same way, the correlation may be one (or 100%). The similarity correlation may be stored as part of the documentation of the trend, optionally in association with each term. The similarity correlation may be used for identifying a trend based on an analysis of content a web document, based on matching terms according to a correlation requirement, as described herein.

Optionally, the highest ranked terms and/or terms having similarity correlations according to a matching requirement (e.g., above a threshold, and/or within a range) are documented in association with the trend and stored in the trend dataset. For example, when several terms are extracted for a web document, the sub-set of terms above the requirement may be stored in association with the matched trend.

Each monitored web document may be associated with one or multiple trends. Different terms may be stored in associated with different trends.

Optionally, the associated extracted terms are ranked according to a relevancy score calculated for each of the extracted terms relative to the respective trend, for example, by a statistical clustering module that assigns higher scores to terms that cluster closer to the trend.

The sub-set of the ranked terms may be stored in the trend dataset in association with the trend according to a relevancy requirement, for example, the highest 5 terms may be stored, or the terms meeting the relevancy requirement may be stored. The relevancy requirement may be, for example, a threshold, a range, and/or a function.

At 608, the dataset is created, by storing at least some of the extracted terms in association with the respective trend in the trend dataset. The terms may represent a description of the trend.

Optionally, at 610, code implemented by processor 208 of node 202 iteratively updates trend dataset 224. Alternatively or additionally, the trend servers(s) issue messages to node 202 with updates to trend dataset 224. The updates may include removal of existing trends documents within trend dataset 224, for example, according to an expiration profile defining the expiration date of the trend, according to a timer that defines how long the trend is active (e.g., from start to end), according to a requirement (e.g., number of searches per day), and/or when the existing trend is no longer identified by the trend server as a trend. The updates may include addition of new trends, such as provided by the trend server. The entire trend dataset may be updated, or parts thereof. The updating may be performed, for example, continuously, periodically, and/or based on events (e.g., the event server providing a new trend and/or sending a message indicative of expiration of the trend).

At 104, a web document retrieved from a web document server 228 over network 206 by browser 216 of client terminal 204 is designated for analysis. The designation is optionally performed by code of client module 220 implemented by processor 214 of client terminal 204. Designation may be trigged by selection, access, and/or loading of the web document by the browser. Alternatively or additionally, the web document is designated for analysis in a pre-processing stage, optionally multiple web documents are designated for the analysis, for example, by a crawler mechanism (which may be stored in node 202) that maps each web document to one or more trends, as described herein. Designation may trigged in the pre-processing stage when the user enters search keywords of a search query submitted prior to the loading of the web document, such as to designated the web document selected from the search results.

The web document may be, for example, a text item (e.g., a news article, a blog entry), a webpage, an extensible markup language (XML) page, a hypertext markup language (HTML) page, a portable document format (PDF), an executable, an email, an audio and/or video file, an image and/or any other network accessible content file. The web document may be a webpage or any other network accessible destination. The reference to the web document may be, for example, a Uniform Resource Locator (URL) or a Universal Resource Identifier (URI).

Optionally, web document server 228 has installed thereon a client module which may perform one or more functions of client module 220 described herein.

Optionally, the preprocessing designation of the web document is performed by the client module of the web document server. In this manner, the web document may be pre-designated before being accessed by each instance of browser 216 installed on a respective client terminal 204.

At 106, content in the designated web document is analyzed to identify a relation to at least one trend documented in a trend dataset, by code, such as a web document analyzer 232, implementable by processor 208 of node 202. Alternatively, no trends are identified.

Optionally, the content is analyzed based on terms extracted from the content of the web document and/or metadata associated with the web document. Terms may be extracted using machine learning and/or natural language processing methods. Terms may be extracted, for example, as described with reference to block 606.

Optionally, the trend(s) is identified by mapping one or more of the extracted terms to the trend dataset, for example, by a statistical classifier that accepts the terms as inputs and maps to one or more of the statistically closest trends documented in the dataset. Alternatively or additionally, the trend is identified based on a similarity score calculated between one or more terms extracted from the content of the web document and the terms stored in relation to at least some trends documented in the trend dataset. The trend may be identified according to a similarity requirement in view of the similarity score, for example, the highest similarity score(s). The similarity requirement may be, for example, a value, a range, a threshold, and/or a function. It is noted that in some cases, no trends are identified.

Optionally, the certainty of the mapping and/or the similarity requirement is adjustable, automatically or manually by a user. For example, a high value represents a high relation between the extracted terms and the trend, and a low value represents a vague relation between the extracted terms and the trend. The certainty and/or similarity requirement may be automatically adjusted, for example, downwards to increase the pool of possible matches, when no trends are matched to a high certainty the certainty may be reduced such that at least some trends are matched. In another example, the certainty and/or similarity requirement are automatically adjusted, for example, upwards to reduce the pool of possible matches, when the number of matches using current requirements is predicted (or determined) to be large.

Optionally, when two or more different trends are identified as related to the analyzed content, the two or more trends are consolidated into a single trend. The two trends may have the same or statistically similar correlation. For example, an article discussing a new year's eve party maps to the trends Happy New Year and 2016. Both trends may be consolidated, for example, to Happy New Year 2016. The single consolidated trend may be matched to a single group of user uploaded media content items for providing a single presentation.

At 107, the identified trend(s) is provided. Optionally, the identified trend is provided to aggregation module 234, which uses the identified trend as input to generate the presentation of related user uploaded media content items, for example, as described with reference to FIG. 3. Alternatively or additionally, the identified trend is stored, forwarded to another server, undergoes additional processing, and/or is transmitted to the client terminal for display (e.g., in a box appearing within the web document stating the trends identified within the web document).

Figure 3:
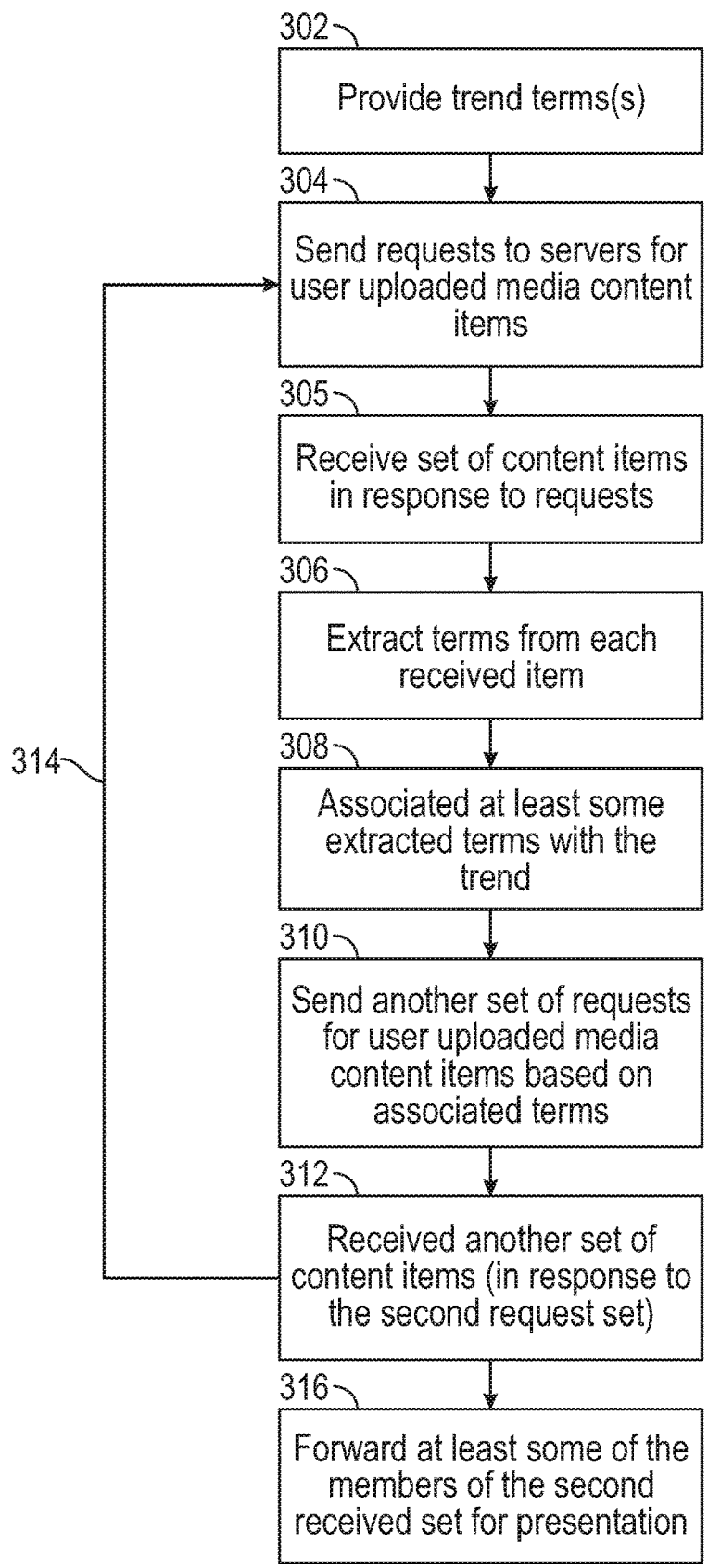
FIG. 3 is a flowchart of a method for creating a presentation based on social media content related to a trend, in accordance with some embodiments of the present invention.

Reference is now made to FIG. 3, is a flowchart of a method for creating a presentation based on social media content related to a trend, in accordance with some embodiments of the present invention. The content items may be aggregated and/or the presentation may be generated from the content items by code, such as aggregation module 234, implementable by processor 208 of network node 202. The method may identify the most relevant user uploaded media content items related to the trend, and generate the presentation from the identified items (or subset thereof).

At 302, one or more terms representing a trend are provided for generation of the presentation. The terms may be text words.

Optionally, the trend and/or terms representing the trend is received from output from code that identified the trend by an analysis of content of a web document, for example, as described with reference to FIG. 1, such as the output of block 107.

Alternatively, the trend and/or terms representing the trend are received as input from client terminal 204, for example, manually entered by a user, and/or identified by a search performed by the user. In such a case, one or more search terms received by node 202 from client terminal 204 are designated to be used as a basis for generation of the presentation, for example, via browser 216 accessing a search engine stored on node 202. Node 202 may provide web services to search for trends and receive the presentation, without necessarily requiring accessing the web document stored on web document server 228 (e.g., as described with reference to FIG. 1). The search engine includes code to receive one or more search terms from client terminal 204, optionally via a client interface of interface 212, for example, entered into a graphical user interface (GUI) search page provided by node 202. In such a case, the trend(s) documented in the trend dataset are identified according to the received search term(s).

At 304, a set of first requests is sent to multiple web servers, optionally social network servers 236. The request includes the terms associated with the received trend. The request includes a request for the respective server to provide user uploaded media content items related to the transmitted terms associated with the received trend.

Social network servers 236 may host user profiles containing the user uploaded media content items. Social network servers 236 may include connections (e.g., links, friend relationships) among users for sharing of the user uploaded media content items. The user uploaded media content items may be designated for sharing by the user with selected users, and/or for sharing with anybody (i.e., publicly available to all users of the social network and/or publicly available to non-users of the social network). The user profiles containing the user uploaded media content items may be, for example, one or more of a blog, a personal profile webpage, and a personal webpage including content items tagged with sharing permission.

The request may be generated and/or transmitted by trend dataset creator 230 using a social streaming interface component of interface 212, for communication with an interface of one or more web servers, optionally social media servers 236. The monitored media content items may be collected, such as stored, optionally temporarily, in a datastore in association with node 202.

As used herein, social media content items and user uploaded media content items are interchangeable.

The social media content or user uploaded media content file may include images and/or video files uploaded by members of a social network, statuses and/or posts uploaded by members of a social network, for example text files, metadata related to images and/or video files and/or statues such as comments and likes data and/or the like. The social media content may be referred to one or more files and/or any other user uploaded content. The social media content includes or is associated with tags and/or metadata indicative of, for example, capturing location, capturing time, capturing photographer characteristics and/or any other data or metadata indicative of the content depicted thereby.

At 305, the first set of user uploaded media content items received from the social network servers in response to the first set of request is received by network node 202. Optionally, the first set of items are stored at each respective server in association with, for example, a blog, a personal profile webpage, a personal online repository of content items (e.g., photos), and a personal webpage including content items tagged with sharing permission.

Optionally, the received items are aggregated by aggregation module 234.

The set of items may be stored together in association with the respective trend, for example, on a datastore in communication with module 234.

Aggregation of the items may generate a pool of data which may be analyzed as a unit, as described herein.

At 306, terms are extracted (e.g., by trend dataset creator 230) from the set of aggregated content items. Terms may be extracted from each of the user uploaded media content items and/or from metadata associated with teach item. Terms may be extracted by code, such as an extraction engine component of aggregation module 234, implemented by processor 208 of node 202. Terms may be extracted based on machine learning methods and/or natural language processing methods.

Terms may be extracted from the text of the content item (e.g., words found in an article, words appearing in an image by an image analysis program that identifies text and/or segments text in the image, and/or words appearing in a video by the image analysis program), from metadata such as tags associated with the content item (e.g., a user label assigned to images describing what is depicted in the image), from the name of the content item file, from sounds in the content item (e.g., converted from speech to text by a software module operating on a sound file and/or video file), and/or from images in the content image.

Optionally, the terms are extracted from one or more hashtags. The extracted term may be the hashtag.

Optionally, the terms are extracted from metadata (e.g., tags) associated with the user uploaded content items, such as metadata associated with images.

Optionally, the terms are extracted from a manually entered user comment and/or manually entered user caption (i.e., text words) associated with the media content item.

Optionally, at 308 at least some of the extracted terms are associated with the respective trend. The extracted terms may be stored in the trend dataset as terms documented in association with the trend.

Optionally, the most relevant terms are designated for association with the respective trend.

Optionally, a statistical classifier is applied to the extracted terms to identify the set of extracted terms correlated with the respective trend, such as according to a similarity requirement. The statistical classifier may assign a similarity value, such as a probability and/or statistical distance. The similarity requirement may be a threshold, a range, and/or the number of the highest values when sorted. For example, a statistical clustering module assigns higher scores to terms that cluster closer together around the trend.

Optionally, a similarity correlation is calculated between each (or the set of) extracted term and the term(s) representing the trend. The similarity correlation represents the similarity between the extracted term and the trend term, for example, when the extracted term and the term representing the trend are the same word spelled the same way, the correlation may be one (or 100%). Alternatively, the dataset already contains the similarity correlation values, as described herein. In such a case, the most relevant terms may be designated according to a requirement in view of the correlation values.

The similarity requirement may be dynamically adjusted to match to a group of a predefined size, for example, to place a cap on the memory and/or processor resources required.

The sub-set of the ranked terms may be stored in the trend dataset in association with the trend according to a relevancy requirement, for example, the highest 5 terms may be stored, or the terms meeting the relevancy requirement may be stored. The relevancy requirement may be, for example, a threshold, a range, and/or a function.

Optionally, at 310, a second set of requests is generated and transmitted to the social network servers. The second set of request includes the terms (or subset thereof) extracted from the first set of items.

The requests may be generated and/or transmitted (e.g., via network messages, such as packets) by aggregation module 234, to interfaces (e.g., APIs) of each social network server, to provide uploaded user content media items that match and/or correlated with the terms. The second request set may be designed to trigger the social network servers to respond with content items that are more closely associated and/or better represent the trend than the first set.

It is noted that the second set of requests may be transmitted to servers that are the same, different, and/or overlapping with the servers that responded to (or received) the first set of requests.

At 312, the second set of user uploaded media content items in response to the second request is received by node 202. The received items may be aggregated.

Optionally, the received second set of user uploaded media content items are ranked according to a relevancy score calculated for each of the received user uploaded media content items relative to the respective trend, to select a subset of members. The relevancy score may be calculated, for example, by a statistical classifier, correlation module, machine learning classification methods, and/or other methods. A sub-set of the media content items may be designated for association with each trend according to a relevancy requirement, for example, a number of the highest scoring items, and/or all items meeting the relevancy requirement.

Alternatively or additionally, the subset of members of the second set is selected according to at least one selection parameter. Optionally, the selection parameter is based on one or more characteristics of the user uploaded media content items that are independent of the respective trend, for example, image quality, user feedback, date of publication, and storage size. In this manner, the user uploaded media content items may be ranked to provide the best content items, such as image quality and/or storage size suitable for presentation on the client terminal, user popular items, and/or newly posted items.

Optionally, the selection of the subset of member content items is performed based on one or more selection parameters, optionally a weight parameter. Content items may be filtered (before or after the match) based on meeting or not meeting the parameter(s), and/or ranked based on the value of the parameter. Optionally, the selection is based on language similarity between the terms associated with the trend and each of the user uploaded media content items in the set.

Alternatively or additionally, the selection is based on geographical proximity between a geographical location associated with the trend and each of the user uploaded media content items in the set. The location may be determined, for example, by geographical location of the providing server, and/or by metadata associated with the content items.

Optionally, the identified members include one or more advertisement content items (e.g., provided by an advertisement server connected to network 206) related to the trend. The advertising content items may be treated as user uploaded content items by the systems and/or methods described herein, being associated with trends based on extracted terms. In this manner, each trend is associated with one or more ads, which become included in the group for presentation. For example, when the trend relates to the wedding of a famous actor, advertisement content may relate to wedding products or services, and/or to a new movie starring the actor.

It is noted that the selection of the sub-set may alternatively or additionally be performed on the first received set of content items.

Optionally, at 314, code implemented by processor 208 of node 202 iteratively repeats one or more of blocks 304-312, to send additional request to the social network servers for content items. The additional request may contain additional terms and/or different terms, which may better represent the trend. The requests generation and transmission may be terminated, for example, based code that analyses the content items to determine that a requirement has been met, for example, a number of content items to present, and/or a similarity values between the received items and the trend.

At 316, at least some members of the identified group of content items are forwarded to a presentation on display 218 of client terminal 204. Optionally, client terminal 204 presents the web document which is analyzed to identify the trend for generation of the presentation. Forwarding may be performed by transmission of the presentation as a series and/or sequence of network messages (e.g., packets) over network 206 via interface 212 of node 202. Forwarding may be performed by code stored in program store 210, implementable by processor 208 of node 202.

Optionally, the members of the groups are clustered into a single presentation.

Optionally, the presentation includes a simultaneous presentation including all members of the group. Alternatively, the presentation includes some of the members, the rest being viewable, for example, by automatically and/or manual scrolling, and/or when a larger viewing window is selected.

Optionally, the presentation is implemented as an overlay over a part of the web document. Alternatively, the presentation is implemented as another window opening on another part of the display. Alternatively, the presentation is implemented within the web document, for example, within a content box integrated within the content of the web document.

Optionally, the presentation includes members of the group organized as a collage, optionally as adjacent tiles, as one or multiple rows.

Optionally, the members of the group are sorted for presentation. Sorting may be performed, for example, according to time of uploading the item, according to posting user, and/or according to social network source.

The presentation may be updated over time when new user uploaded media content files are uploaded indicative of the trend related to in the designated web document.

An example of the method of FIG. 3 is now described. At 302, trend key words John Smith are received at the time when a well known actor is getting married to Jane Doe. At 304, additional content items are requested by a first set of requests. At 306, the hashtags #johnsmithwedding and #janedoe are extracted from the first set of received items, based on high relevancy scores. At 310, the hashtags and the trend key words are transmitted to social network servers as a second set of requests for content items. At 312, the most relevant content items from the received second set are identified, which include pictures of the wedding uploaded by users that attended the wedding. At 316, the pictures forwarded to the client for presentation.

Figure 4:
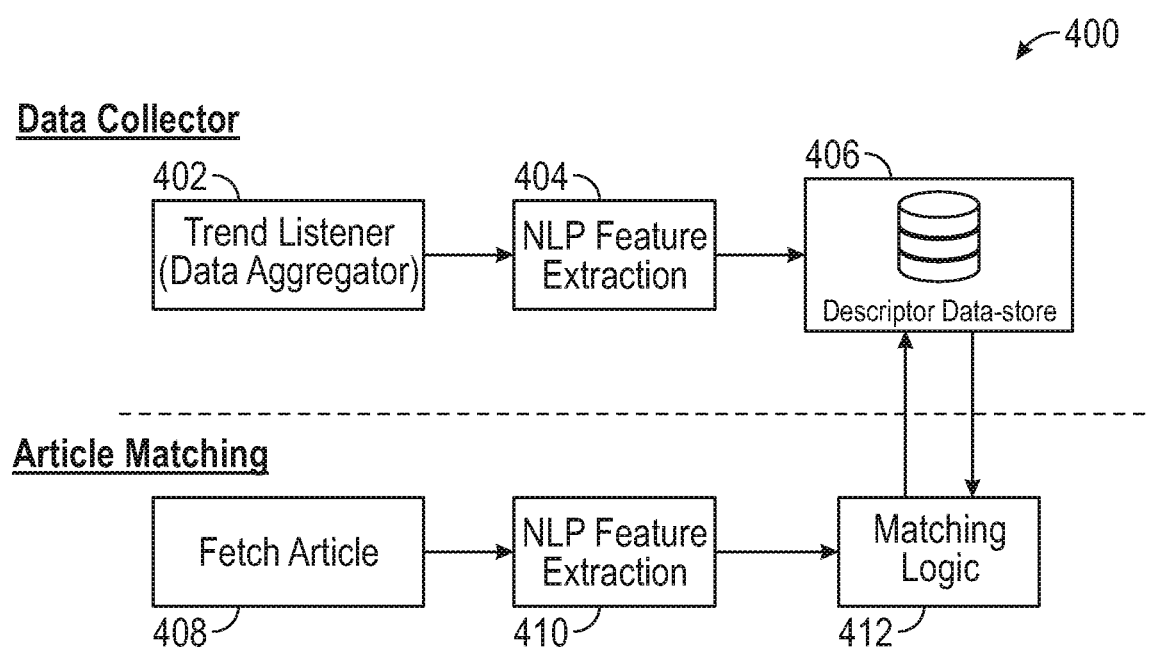
FIG. 4 is a block diagram of components of a system for matching a web document to a trend, in accordance with some embodiments of the present invention.

Reference is now made to FIG. 4, which is a block diagram of components of a system 400 for matching a web document to a trend, in accordance with some embodiments of the present invention. System 400 may be integrated with system 200 of FIG. 2, and/or may execution portions of the method of FIG. 1 and/or FIG. 6.

A trend listener module 402 aggregates different data items related to the same or similar trend, such as according to identified trends and/or trends documented in a trend dataset (e.g., trend dataset 224). Examples of data items include: user uploaded media content items, web documents, text, images, videos, and/or sound. Data items are collected from the network (e.g., the internet) by module 402, passively (e.g., by monitoring traffic and/or websites) and/or actively (e.g., by issuing requests to APIs of network servers to provide trend related data). A natural language processing (NLP) module 404 extracts terms from textual data of the aggregated data for each trend. The terms may be ranked and/or scored for relevancy, as described herein. For each trend, a subset (or all) of the extracted terms are stored in a trend dataset stored in a data-store 406 as a descriptor for the trend.

Modules 402, 404, and 406 may reside as code implementable by a processor of a network node, for example, within program store 210 (or on an external memory or external server) for implementation by processor 208 of node 202 (or another processor of another server in communication with node 202).

A fetch article module 408 retrieves a document from a web document server (e.g., server 228). An NLP term extraction module 410 extracts one or more terms from the web document. A matching logic module 412 identifies one or more trends within trend dataset of data-store 406 based on the extracted terms, for example, by calculation of similarity scores or other classification methods as described herein.

Modules 408, 410, and 412 may reside as code implementable by a processor of a client terminal, for example, within a program store for implementation by processor 214 of client terminal 204. Alternatively or additionally, one or more of modules 408, 410, and 412 are stored in program store 210 and implemented by processor 208 of node 202. For example, client module 220 transmits the URL of the web document being accessed by web browser 216 of client terminal 204 to module 408 of node 202.

It is noted that modules 404 and 410 may include the same code, similar code, or different code for implementation at respective processors. For example, module 410 may be a simplified version of module 404 for implementation by a processor of a client module.

The identified trend may be used as a basis for retrieving related user uploaded media content from social network servers 236 for presentation on client terminal 204, as described herein.

Figure 5A:
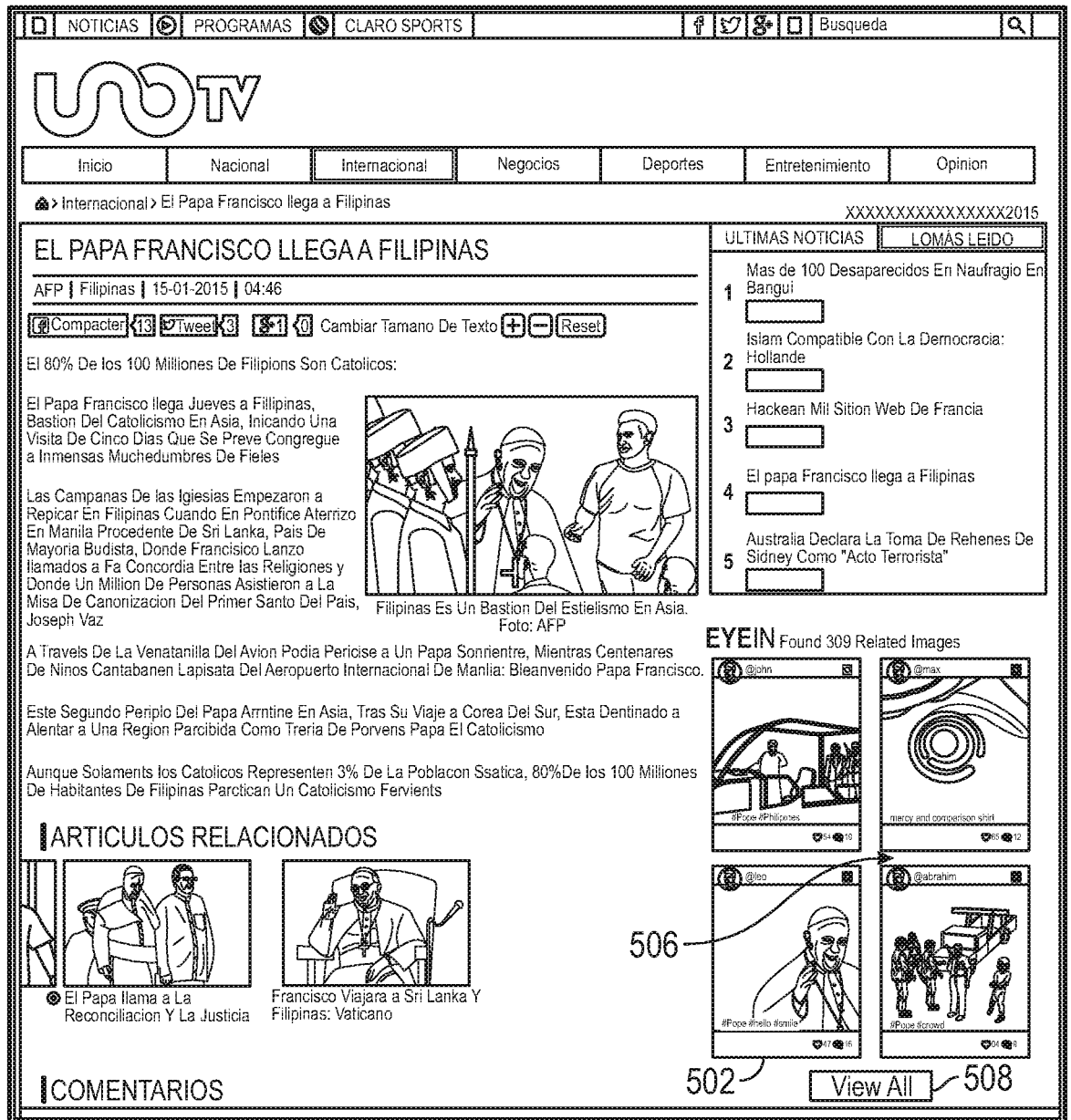
Figure 5B:
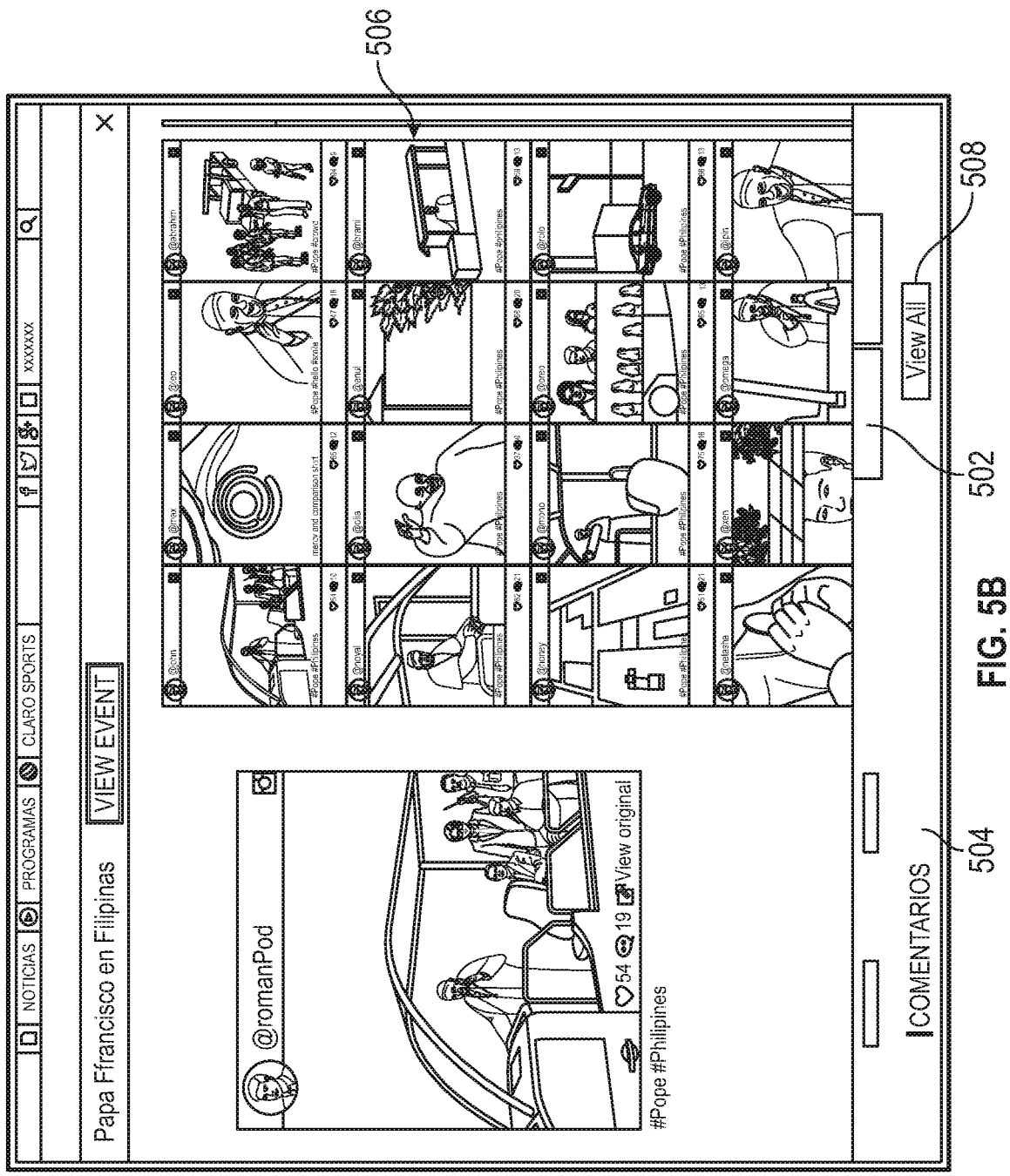

Reference is now made to FIGS. 5A-C, which are a set of screenshots depicting exemplary presentations based on a grouping of social media content related to a trend identified from content of a web document, in accordance with some embodiments of the present invention.

At FIG. 5A, a presentation 502 includes a group of user uploaded media content items 506 related to the trend identified within a designated web document 504 is being viewed within a browser (e.g., 216) on a display associated with a client terminal (e.g., 204). Presentation 502 is displayed together with web document 504.

Optionally, each user uploaded media content file 506 is presented with an icon indicative of the uploading user and/or source thereof, for example Mobli™ database, Twitter™ database, or Instagram™ database.

Optionally, each user uploaded media content file 506 is linked to a source webpage, allowing the user to browse to the source webpage, for example for viewing more images or video clips from the same uploader and/or for viewing the image in higher resolution. Optionally, selecting the user uploaded media content file by a click or touch will induce enlargement thereof and/or instructing the browser to browse to a source webpage. Optionally, the browsing user presented with the uploaded media content file may add a feedback to any of the uploaded media content files which are presented thereto, for example set a like or add a comment. The like and/or the comment are associated with the uploading user, providing a personal feedback thereto.

Optionally, a view all 508 link presents additional matched user uploaded media content files, optionally as a larger overlay over web document 504, as shown in FIG. 5B.

FIG. 5C is a screen shot of a standalone web page 510, which may be accessed, for example, from a link on the presentation, and/or by performing a trend search using key words (i.e., instead of analyzing the web document) via a web browser accessing node 202. The standalone page includes a presentation 512 components of user uploaded media content items as described herein, an optional link 514 to allow the user to add feedback and/or contribute to the trend (e.g., by uploading media content items), and/or one or more links to related articles 516.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the terms network node, server, client, interface and network are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method comprising:
after a browser on a client terminal displays a web document from a web server on the client terminal, receiving at a trend-content-presentation server, from the browser, a designation of the web document for analysis, the designation comprising a Universe Resource Locator (URL) where the web document is located on the web server, the web document comprising a script configured to cause the browser to generate the designation and send to the trend-content-presentation server the designation that comprises the URL, the web server being configured to add the script to the web document;
in response to the designation, using, at the trend-content-presentation server, the received URL to analyze the web document and identify a trend related to content of the web document, the trend represented by a representative term;
sending, from the trend-content-presentation server to a plurality of social network servers, a plurality of first requests, each first request comprising the representative term;
receiving, at the trend-content-presentation server from the plurality of social network servers, a plurality of first user uploaded media content items in response to the plurality of first requests;
extracting, by the trend-content-presentation server, terms from the plurality of first user uploaded media content items;
identifying, by the trend-content-presentation server, a set of identified terms correlated with the trend by applying a statistical classifier to the extracted terms, the statistical classifier being configured to:
assign similarity values to one or more terms in the extracted terms based on similarity to the trend, the one or more terms comprising a first term and a second term, the first term clustering closer to the trend than the second term, and the first term is assigned a higher similarity value than the second term; and
identify the set of identified terms from the extracted terms based on the similarity values and a similarity requirement, the similarity requirement being a threshold value that is dynamically adjusted upward in response to the set of identified terms being smaller than a predefined size or downward in response the set of identified terms being larger than the predefined size;
sending, from the trend-content-presentation server to the plurality of social network servers, a plurality of second requests, each second request comprising at least one identified term from the set of identified terms;
receiving, at the trend-content-presentation server from the plurality of social network servers, a plurality of second user uploaded media content items in response to the plurality of second requests;
selecting, by the trend-content-presentation server, at least one media content item of the plurality of second user uploaded media content items based on at least one selection parameter, the at least one selection parameter including language similarity between the at least one identified term and the at least one media content item, the selecting of the at least one media content item of the plurality of second user uploaded media content items including:
ranking the plurality of second user uploaded media content items according to at least one characteristic of the plurality of second user uploaded media content items that is independent of the trend, the at least one characteristic being a member selected from a group consisting of:
image quality; and
storage size; and
determining, from the ranked plurality of second user uploaded media content items, the at least one media content item that has at least one of image quality suitable for presentation on the client terminal or storage size suitable for presentation on the client terminal;
sending, from the trend-content-presentation server to the browser on the client terminal, the at least one media content item to a presentation on the client terminal, the script of the web document being further configured to cause the presentation of the at least one media content item to be simultaneously presented with the web document being presented by the browser, the presentation being implemented as an overlay that is displayed over and covering at least a part of the web document; and
receiving, at the trend-content-presentation server from the browser on the client terminal, a request from a client terminal user to add feedback to the at least one media content item, the feedback being provided by the client terminal user through the presentation, the feedback comprising a comment regarding the at least one media content item, the feedback being associated with an uploading user that uploaded the at least one media content item to one of the plurality of social network servers.

2. The method according to claim 1, wherein each of the trend and the at least one identified term include at least one text word.

3. The method according to claim 1, wherein in response to the plurality of first requests and the plurality of second requests, the plurality of social network servers provides user uploaded media content items stored in association with members selected from a group consisting of:
a blog, a personal profile webpage, a personal online repository of content items, and a personal webpage including content items tagged with sharing permission.

4. The method according to claim 1, wherein the plurality of social network servers includes connections among users for sharing of user uploaded media content items.

5. The method of claim 1, wherein the extracted plurality of terms is extracted from at least one of a hashtag, metadata associated with an image, a manually entered user caption, and a manually entered user comment.

6. The method of claim 1, wherein the at least one media content item comprises at least one advertisement content item related to the trend.

7. The method of claim 1, wherein the at least one selection parameter includes geographical proximity similarity between a geographical location associated with the trend and each in the plurality of second user uploaded media content items.

8. The method of claim 1, wherein the plurality of first user uploaded media content items and the plurality of second user uploaded media content items are selected by the trend-content-presentation server from a group consisting of:
social media content items related to at least one trend, user comments related to the at least one trend, and user reactions related to the at least one trend.

9. A trend-content-presentation server comprising:
a client interface for communicating, via a network, with at least one client terminal hosting a browser displaying a web document;
a trend datastore that hosts a trend dataset storing one or more trends each of which appears in one or more web documents;
a program store storing code; and
a processor coupled to the client interface, the trend datastore, and the program store the stored code comprising:
code to receive, from a browser on a client terminal, a designation of the web document for analysis, the designation comprising a Universe Resource Locator (URL) where the web document is located on a web server after the browser obtains the web document from the web server and displays the web document on the client terminal, the web document comprising a script configured to cause the browser to generate the designation and send to the trend-content-presentation server the designation that comprises the URL, the web server being configured to add the script to the web document;
code to respond to the designation by using the received URL to analyze the web document and identify a trend related to content of the web document, the trend being represented by a representative term;
code to send, to a plurality of social network servers, a plurality of first requests, each first request comprising the representative term;
code to receive, from the plurality of social network servers, a plurality of first user uploaded media content items in response to the plurality of first requests;
code to extract terms from the plurality of first user uploaded media content items;
code to identify a set of identified terms correlated with the trend by applying a statistical classifier to the extracted terms, the statistical classifier being configured to:
assign similarity values to one or more terms in the set of identified terms based on similarity to the trend, the one or more terms comprising a first term and a second term, the first term clustering closer to the trend than the second term, and the first term is assigned a higher similarity value than the second term; and
identify the set of identified terms from the extracted terms based on the similarity values and a similarity requirement, the similarity requirement being a threshold value that is dynamically adjusted upward in response to the set of identified terms being smaller than a predefined size or downward in response the set of identified terms being larger than the predefined size;
code to send, to the plurality of social network servers, a plurality of second requests, each second request comprising at least one identified term from the set of identified terms;
code to receive, from the plurality of social network servers, a plurality of second user uploaded media content items in response to the plurality of second requests;
code to select at least one media content item of the plurality of second user uploaded media content items based on at least one selection parameter, the at least one selection parameter including language similarity between the at least one identified term and the at least one media content item, the selecting of the at least one media content item of the plurality of second user uploaded media content items including:
ranking the plurality of second user uploaded media content items according to at least one characteristic of the plurality of second user uploaded media content items that is independent of the trend, the at least one characteristic being a member selected from a group consisting of:
image quality; and
storage size; and
determining, from the ranked plurality of second user uploaded media content items, the at least one media content item that has at least one of image quality suitable for presentation on the client terminal or storage size suitable for presentation on the client terminal;
code to send, to the browser on the client terminal, the at least one media content item to a presentation on the client terminal, the script of the web document being further configured to cause the presentation of the at least one media content item to be simultaneously presented with the web document being presented by the browser, the presentation being implemented as an overlay that is displayed over and covering a part of the web document; and
code to receive, from the browser on the client terminal, a request from a client terminal user to add feedback to the at least one media content item, the feedback being provided by the client terminal user through the presentation, the feedback comprising a comment regarding the at least one media content item, the feedback being associated with an uploading user that uploaded the at least one media content item to one of the plurality of social network servers.

10. The trend-content-presentation server of claim 9, further comprising a trend interface for communication with an interface of at least one trend server storing at least one of trend search queries and commonly used phrases uploaded by users to social media networks, to retrieve at least one trend from the trend dataset.

11. The trend-content-presentation server of claim 9, further comprising a social streaming interface for communication with an interface of the plurality of social network servers to collect the plurality of user uploaded media content items.

12. The trend-content-presentation server of claim 9, wherein the presentation includes media content items of the plurality of second user uploaded media content items organized as adjacent tiles.

13. The trend-content-presentation server of claim 9, wherein the client interface is in communication with a client module installed as an add-on to the browser of the client module.

14. The trend-content-presentation server of claim 9, wherein the client interface is in communication with a web document server having stored thereon a server module that adds a script to the web document, wherein the at least one client terminal communicates with the client interface using the script in the web document.

* * * * *

UNITED STATES PATENT AND TRADEMARK OFFICE
CERTIFICATE OF CORRECTION

PATENT NO. : 12,001,498 B2
APPLICATION NO. : 14/730358
DATED : June 4, 2024
INVENTOR(S) : Cohen et al.

Page 1 of 1

It is certified that error appears in the above-identified patent and that said Letters Patent is hereby corrected as shown below:

On the Title Page

On page 2, in Column 2, item (56) under "Other Publications", Line 22, delete "lnterview" and insert --Interview-- therefor In the Claims In Column 25, Line 23, in Claim 9, after "store", insert --,--

Signed and Sealed this
Nineteenth Day of August, 2025

Coke Morgan Stewart
*Acting Director of the United States Patent and Trademark Office*